June 29, 1965

R. SCHUSTER 3,191,500

CHAMFERING APPARATUS

Filed April 25, 1963

INVENTOR:

Roman Schuster

June 29, 1965    R. SCHUSTER    3,191,500
CHAMFERING APPARATUS
Filed April 25, 1963    6 Sheets-Sheet 3

INVENTOR:
Roman Schuster

Fig. 7

June 29, 1965 R. SCHUSTER 3,191,500
CHAMFERING APPARATUS
Filed April 25, 1963 6 Sheets-Sheet 6

INVENTOR:
Roman Schuster

United States Patent Office 3,191,500
Patented June 29, 1965

3,191,500
CHAMFERING APPARATUS
Roman Schuster, Funkweg 14, Senden (Iller),
Bavaria, Germany
Filed Apr. 25, 1963, Ser. No. 275,576
Claims priority, application Germany, Apr. 28, 1962,
Sch 31,382
23 Claims. (Cl. 90—11)

The present invention relates to an apparatus for chamfering edges, especially of sheets or plates of wood, plastic, or similar materials, which comprises a motor-driven cutting tool and feeler or guide elements with curved contact surfaces which engage upon the two surfaces of the workpiece adjacent to the edge which is to be chamfered. This apparatus may be provided either with a milling or grinding tool.

The known apparatus of this type are usually provided with feeler or guide rollers in front of and behind the tool, as seen in the direction of feed. These guide rollers therefore engage with the workpiece at considerable distances from the point where the workpiece is acted upon by the cutting or grinding tool. This has the disadvantage that, since the outer surfaces of the workpiece are not fully plane but slightly wavy, the edge of the workpiece is chamfered unevenly.

It is an object of the present invention to provide a chamfering apparatus which avoids this disadvantage and carries out the guiding of the workpiece at points immediately adjacent to the cutting or grinding point. Accordingly, it is a feature of the invention to provide two feeler or guide elements in association with the tool in a manner so as to engage upon the workpiece within a common plane which extends through the axis of the tool and vertically to the edge of the workpiece. Since these guide elements of the new apparatus are located immediately adjacent to the point where the cutting or grinding tool acts upon the workpiece, the edge of the workpiece will always be properly chamfered to a uniform width.

The features and advantages of the present invention will become more clearly apparent from the following detailed description thereof which is to be read with reference to the accompanying drawings, in which:

FIGURE 11 shows a partial front view of the same apparatus as seen in the direction of the arrow XI in FIGURE 7; while FIGURE 12 shows a vertical section as taken along line XII—XII of FIGURE 8.

Figure 1:
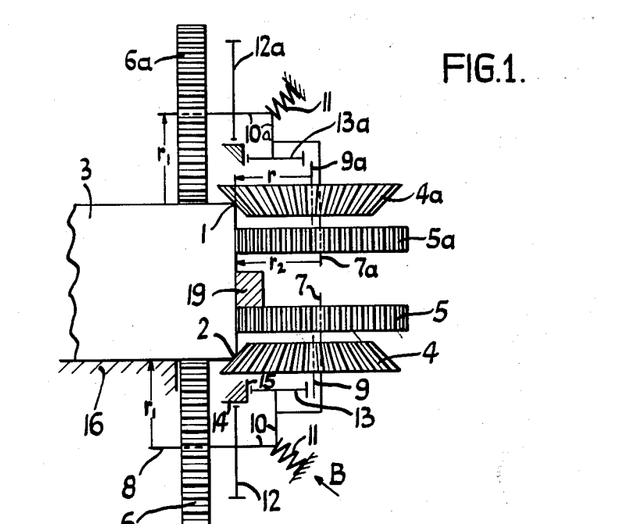
FIGURE 1 shows a diagrammatic front view of two chamfering apparatus according to the invention.
Figure 2:
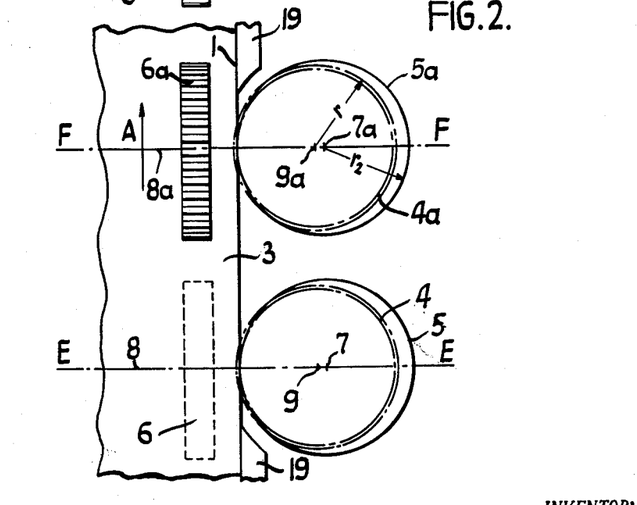
FIGURE 2 shows a plan view thereof.

In the embodiment of the invention as illustrated in FIGURES 1 and 2, two equal apparatus are provided for chamfering the upper edge 1 and the lower edge 2 of a platelike workpiece 3. Each of these apparatus consists of a conical milling or grinding tool 4 or 4a and two feeler or guide rollers 5 and 6 or 5a and 6a, respectively. Each of these tools is therefore associated with a pair of guide rollers which are rotatable about their axes 7, 8 or 7a, 8a, respectively, and are mounted so as to engage upon the workpiece 3 within a common plane which extends through the axis 9 or 9a of the tool and vertically to the edge 1 or 2 of the workpiece. For carrying out the chamfering operation the workpiece 3 is moved along stops 19 in the feed direction as shown by the arrow A past the milling or grinding fixtures which are mounted in a fixed position.

The guide rollers 5 and 6 have an equal diameter which exceeds that of the tools 4 and 4a. Consequently, the workpiece 3 moving in the feed direction A first engages with the guide rollers 5, 6 or 5a, 6a before engaging with the tools. In this manner any danger that the workpiece might be ripped or broken at its first engagement with one of the tools will be avoided.

As indicated diagrammatically in FIGURES 1 and 2, each conical tool 4 or 4a (together with the motor, not shown, for driving it) and the two guide rollers 5 and 6 or 5a, 6a, respectively, are mounted in or on a common support 10 which is adjustably mounted and acted upon by a spring 11 which tends to press the support 10 in the direction of the arrow B toward the edge 2 of the workpiece 3. Thus, both guide rollers 5 and 6 are pressed by the spring 11 with equal force against the workpiece. The support 10 is provided with two setscrews 12 and 13 which extend at right angles to each other. Each of these setscrews may be adjusted so as to engage upon a stationary stop 14 or 15, respectively, in order to adjust the guide rollers 5 and 6 to their basic positions relative to the workpiece 3. In this basic position, the guide rollers 5 and 6 project into the path of movement of the workpiece and are therefore forced back by the latter. As shown in FIGURES 1 and 2, two equal chamfering apparatus according to the invention, each mounted on or in a support 10 or 10a, may be provided directly behind each other in the feed direction A for chamfering simultaneously the upper edge 1 and the lower edge 2 of a board 3 or the like.

Figure 3:
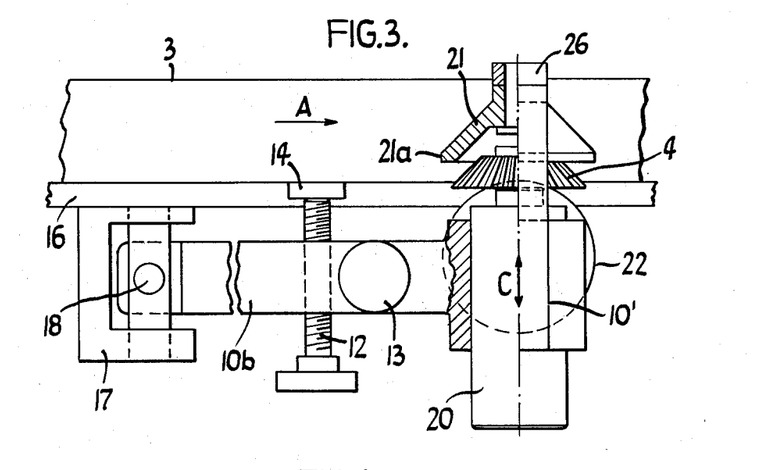
FIGURE 3 shows a side view of a chamfering apparatus according to a modification of the invention.
Figure 4:
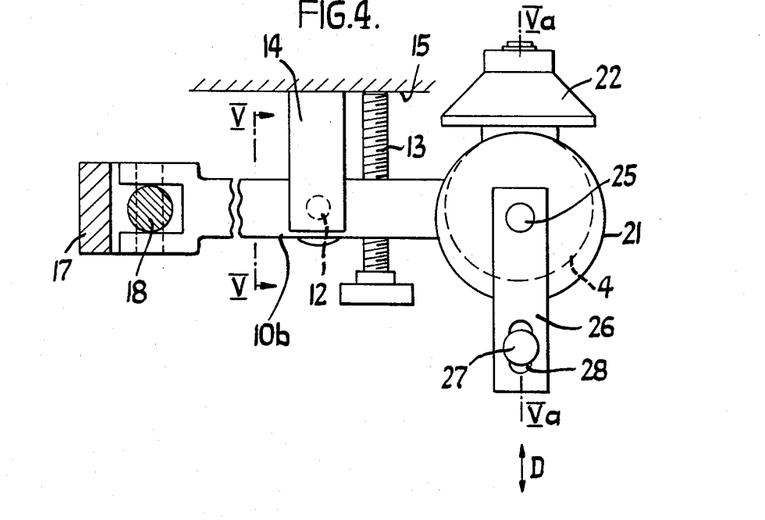
FIGURE 4 shows a plan view of the apparatus according to FIGURE 3.
Figure 5:
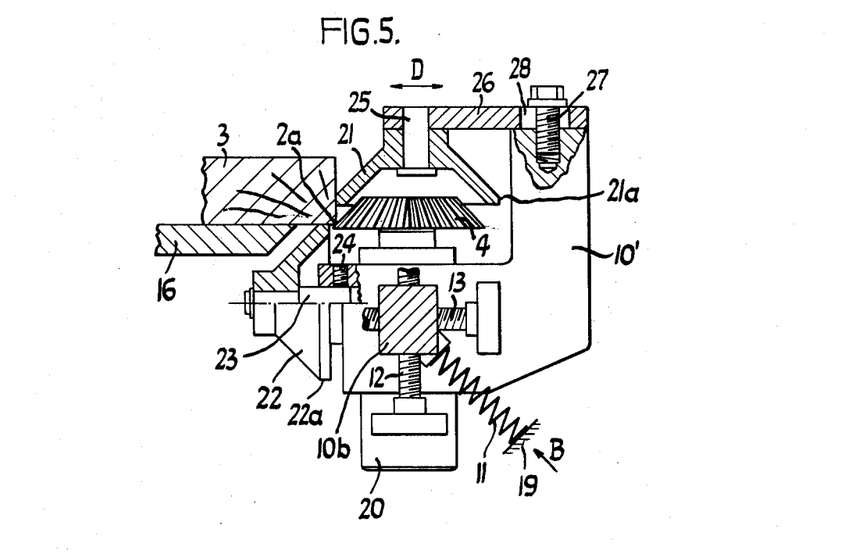
FIGURE 5 shows a cross section which is taken along line V—V, and partly along line Va—Va of FIGURE 4.

FIGURES 3 to 5 illustrate a preferred design of the chamfering apparatus according to the invention. A bearing member 17 is secured to a stationary table 16 and has a supporting element 10b mounted thereon so as to be pivotable in all directions by means of a universal joint 18 or the like. As shown particularly in FIGURE 5, the supporting element 10b is pressed in the direction of the arrow B toward the edge 2 of the workpiece 3 by a spring 11 which is mounted on a fixed support 19. The supporting element 10b carries the motor 20 for driving the milling cutter 4 which is mounted on the shaft of the motor, and it also carries the guide rollers 21 and 22. Motor 20 together with the cutter 4 and the two guide rollers 21 and 22 are adjustable relative to each other within the same plane. In this particular embodiment of the invention, motor 20 is mounted in the supporting element 10b so as to be adjustable in its axial direction, as indicated by the arrow C in FIGURE 3, that is, in the vertical direction, and the two guide rollers 21 and 22 are adjustable at right angles thereto in the direction as indicated by the arrow D in FIGURES 4 and 5. For this purpose, shaft 23 carrying the roller 22 is slidable in the supporting element 10b in the direction D and is adapted to be locked in the adjusted position to the supporting element by means of a screw 24. Shaft 25 carrying the other guide roller 21 is mounted on an arm 26 which is secured by a bolt 27 to an angular arm 10' of the supporting element 10b. For adjusting the guide roller 21 in the direction D, arm 26 may be provided with an elongated slot 28 for receiving the bolt 27.

The guide roller 21 according to the preferred embodiment of the invention as shown in FIGURES 3 to 5 forms a hollow truncated cone which has a shape in accordance with that of the cutter 4 and covers the latter and is provided on its periphery with a cylindrical contact surface 21a. This particular construction has the advantage that the conical guide roller 21 can be mounted above the conical cutter 4 at a very short distance therefrom, as may be seen in FIGURE 5. This arrangement of the guide roller therefore also permits the edges of workpieces of a relatively small thickness of only a few millimeters to be chamfered.

Since this conical guide roller covers the cutter 4, it also serves as a guard for preventing the cutter from being accidentally touched so that the danger of injury is reduced considerably.

As shown in the drawings, the other guide roller 22 is preferably also made of the same conical shape as the roller 21 and also provided with a cylindrical contact surface 22a.

Figure 6:
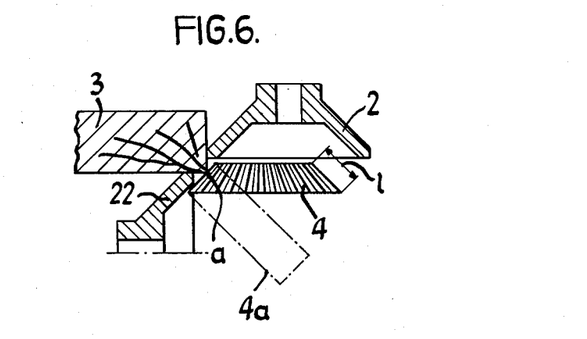
FIGURE 6 shows a cross section similar to FIGURE 5, but with the feeler or guide elements and the tool in a different position.

Since the cutter should not be worn merely at one point but as uniformly as possible across its entire outer surface, the chamfering apparatus is preferably designed so as to permit the guide rollers and the motor carrying the cutter to be adjusted relative to each other so that the cutting point $a$ of the cutter, as indicated in FIGURE 6, may thus be shifted relative to the edge of the workpiece to be chamfered. In place of a conical tool 4 in the form of a milling cutter or grinding wheel it is also possible to employ a cylindrical tool, as indicated in dotted lines at 4a in FIGURE 6.

FIGURES 7 to 12 illustrate a further embodiment of the invention, in which two units, each comprising a motor, a tool, and a pair of feeler or guide members, are provided for chamfering simultaneously the upper edge 1 and the lower edge 2 of a workpiece 3. These two units are mounted on a post 30 which is secured to the table plate 29 and are pivotable about this post within a horizontal plane and are adjustable thereon to different positions in the vertical direction. Since these two units are essentially alike, the corresponding parts of both units are hereafter identified by the same reference numerals to which, however, the letter $a$ is added if they refer to the parts of the lower unit.

Figures 9, 10:
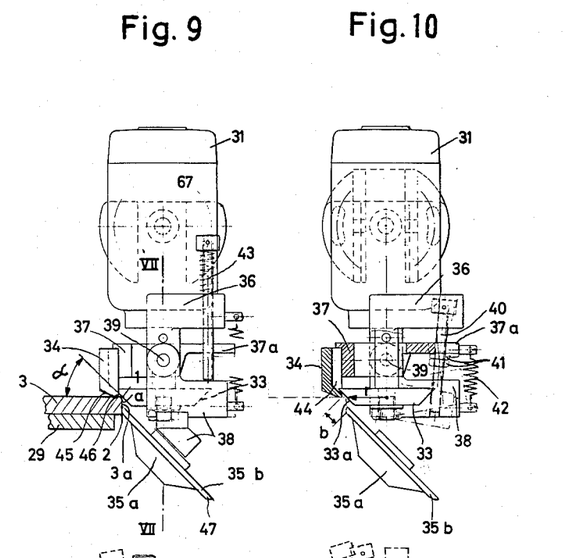
FIGURE 9 shows a partial front view of the apparatus, as seen in the direction of the arrow IX in FIGURE 7.
FIGURE 10 shows a vertical section of the same apparatus as taken along line X—X of FIGURE 7.
Figures 11, 12:
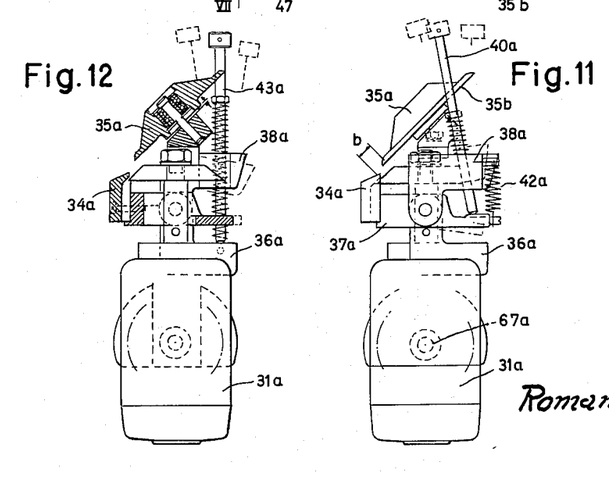

The upper unit comprises an electric motor 31 which is mounted in a vertical position and the shaft 32 of which carries a frusto-conical tool 33. It further comprises the two feeler or guide members 34 and 35a, 35b which are both mounted on the same supporting element 36 on which the motor 31 together with the tool 33 and the two guide members 34 and 35a, 35b are adjustable relative to each other within the same plane X—X. This common supporting element 36 on which the motor 31 is rigidly secured carries a pair of coaxial pins 39 on which two supporting brackets 37 and 38 for the two guide members 34 and 35a, 35b are pivotable. By means of a common adjusting member 40, these two brackets 37 and 38 are adjustable relative to each other so as to permit the two guide members 34 and 35a, 35b to be adjusted to a position in which they are spaced at a distance $b$ from each other, as shown in FIGURE 10. This adjusting member 40 consists of a setscrew which is screwed into the bracket 38 and carries stop nuts 41 against which the arm 37a of bracket 37 is pressed by a tension spring 42 the ends of which are connected to arm 37a and to bracket 38. By varying the size of the distance $b$, it is possible to chamfer the edge 1 or 2 on the workpiece 3 so as to have any desired width.

The apparatus is further provided with a second adjusting member 43 in the form of a setscrew which permits both brackets 37 and 38 carrying the guide members to be pivoted together about the pivot pins 39 relative to the supporting element 36. By this pivotable adjustment of both guide members together about the pins 39 it is possible to shift the cutting point $a$ of the tool gradually across its outer surface so that the entire cutting surface of the tool may be fully utilized before it will be necessary to exchange or resharpen the tool.

It is further evident from the drawings that the two guide members 34 and 35a, 35b partly cover the tool 35 directly adjacent to the cutting area 33a thereof. Since these two guide members are pivotable about the pins 39, they may be adjusted by means of the setscrews 40 and 43 so as to be shifted substantially in the direction parallel to the cutting surface 33a of the tool.

In the particular embodiment of the invention as shown in the drawings, guide member 34 is mounted on the bracket 37 in a substantially perpendicular position and has on its side facing the tool 33 an arcuate recess 44 into which the tool may enter when the guide member 34 is being adjusted relative to the tool. The lower end 45 of guide member 34 facing the workpiece 3 is also inclined at such an angle that a narrow contact surface 46 is formed which is located immediately adjacent to the tool 33. The guide roller 35a has an annular flange 35b and a plane surface on the side facing the tool which extends substantially at the same angle as the cutting surface 33a of the tool. The contact surface 47 on this flange 35b of guide roller 35a is rounded. The design and arrangement of the guide members as previously described permits the contact surfaces 46 and 47 thereof to be located very closely to the edges 1 and 2 to be chamfered on the workpiece 3 so that the chamfering operation may be carried out very accurately and the edges 1 and 2 will always be chamfered to a uniform width.

Figure 7:
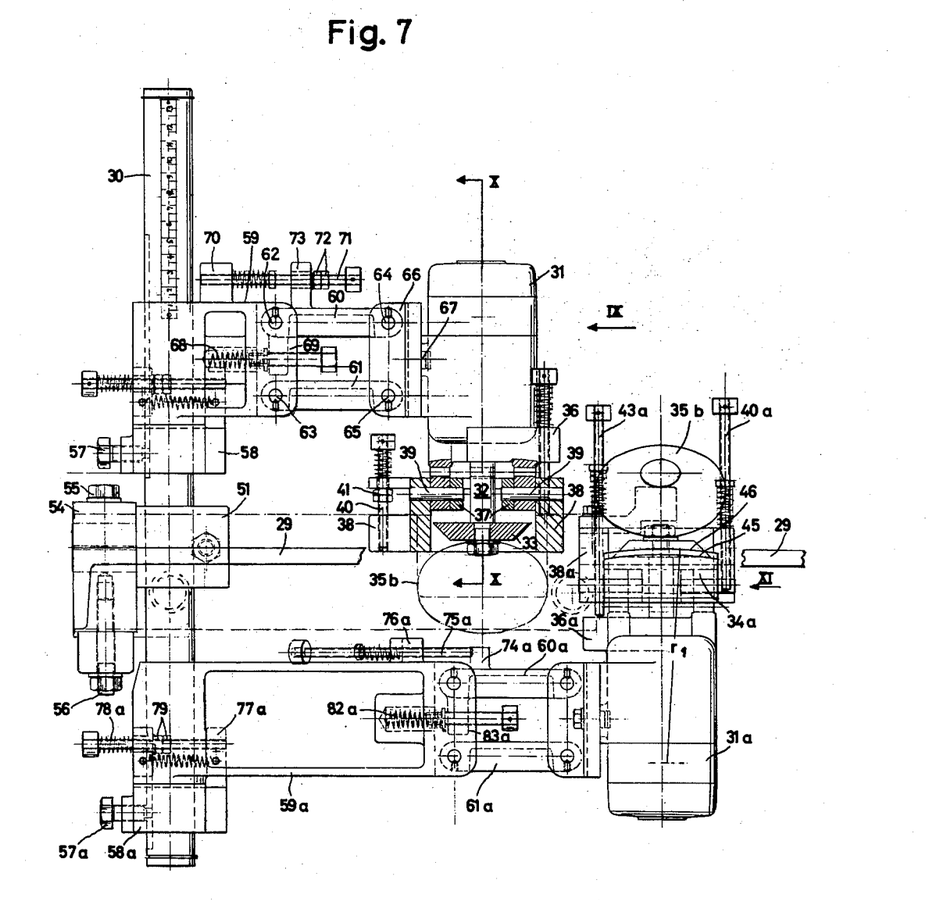
FIGURE 7 shows a side view, partly in cross section, which is taken along line VII—VII of FIGURE 9, of two apparatus according to a further modification of the invention for chamfering the upper and lower edges of a workpiece.
Figure 8:
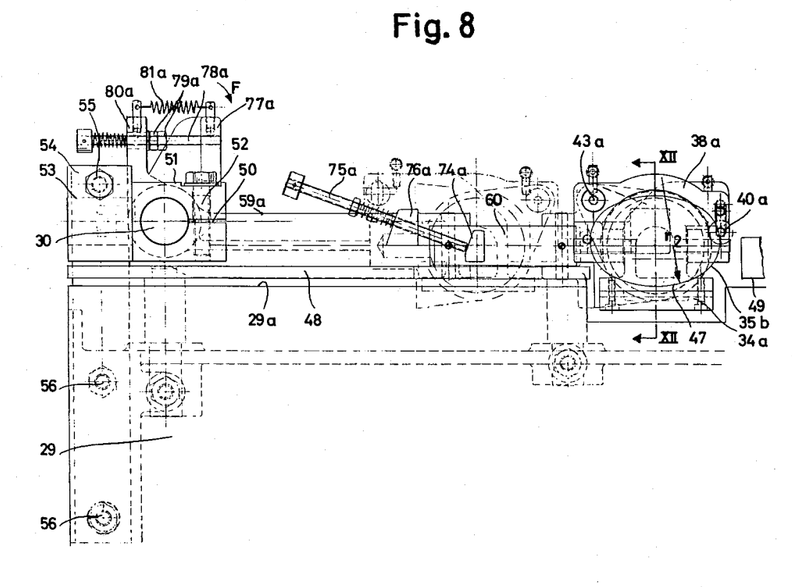
FIGURE 8 shows a plan view of the apparatus according to FIGURE 7, but only of the part for chamfering the lower edge of the workpiece.

As illustrated in FIGURES 7 to 9, the effective radii of curvature $r_1$ and $r_2$ of the two guide members 34 and 35b are considerably larger than the radius of curvature $r$ of the tool. This insures that, when the workpiece is fed toward the chamfering apparatus, it first engages only with the guide members and will not engage with the tool until it has pushed back the guide members. Thus, any damage to the workpiece when it first engages with the tool will be prevented.

As shown in FIGURES 7 and 8, stops 48 and 49 are provided for guiding the workpiece along the edge 29a of the upper surface of the work table. At the other side of the stop 48, post 30 is clamped by a bolt 52 in an annular clamping member 51 which is slotted at 50. This clamping member 51 has integrally thereon a horizontal trunnion 53 extending parallel to the table edge 29a. By means of this trunnion 53, clamping member 51 is pivotably mounted in a bracket 54 and may be clamped tightly thereon in any desired position by means of a bolt 55. Bracket 54 is secured by bolts 56 to the table plate 29.

Above the table plate 29, post 30 carries a supporting ring 58 which may be clamped to the post by a bolt 57. This ring 58 supports a swivel arm 59 which extends parallel to the table edge 29a and may be swiveled about post 30 on the upper surface of ring 58. Swivel arm 59 carries the electric motor 31 by means of a parallelogram linkage system which is movable within a perpendicular plane. This linkage system consists of the two links 60 and 61 which are pivotably connected at one end at 62 and 63 to the swivel arm 59 and at the other end at 64 and 65 to a bracket 66 on which the housing of motor 31 is secured. The motor housing may be swiveled about a horizontal axis 67 which extends parallel to the table edge 29 and may be locked to the bracket in any adjusted position. By being able to turn the motor about the axis 67 to different angular positions, it is possible to provide the workpiece 3 with a chamfer of any desired angle (FIGURE 9). The motor housing carries the common supporting member 36 which may be integral with the housing.

In order to balance the weight of the unit 31 to 42 comprising the motor 31, the tool 33, and the guide members 34 and 35a, 35b at least to some extent, a compression spring 68 is provided in the swivel arm 59 which acts upon a projection 69 on the upper link 60. For limiting the extent of the downward movement of the unit 31 to 42, a setscrew 71 which is screwed into a projection 70 on the swivel arm 59 passes through a projection 73 on link 60 and carries stop nuts 72 on which the projection 73 engages. Stop nuts 72 are adjusted so that the contact surface 46 of guide member 34 will be located in the path of movement of the workpiece so that, when the workpiece is fed into the apparatus this guide member 34 will be lifted. Since the contact surface 47 of guide roller 35b as shown in FIGURE 8 also lies within the path of movement of the workpiece, this guide roller will also be forced back by the workpiece, whereby the unit 31 to 42 will be swiveled about the post 30. Due to this swivel arrangement and the provision of the parallelogram linkage system 60 to 66, the supporting element 36 (and thus also the motor 31 and the tool 33) is movably mounted in such a manner that it will retain its position within the common plane X—X and also within the plane extending at right angles thereto.

In order to be able to chamfer both the upper edge 1 and the lower edge 2 of a workpiece simultaneously, a second unit 31a to 42a is provided which also comprises a motor, a tool, and a pair of feeler or guide members and is mounted on post 30 on a swivel arm 59a which carries a parallelogram linkage system 60a, 61a underneath the table plate 29. Both units are maintained by spring force in their basic positions. The fixed supporting ring 58a has a projection 77a thereon into which a setscrew 78a is screwed which carries stop nuts 79a on which a projection 80a engages which is provided on the swivel arm 59a. A tension spring 81a connects the two projections 77a and 80a so that the swivel arm 59a is always drawn in the direction of the arrow F and is thereby pressed against the stop nuts 79a which determine the basic position of the guide roller 35b.

At the inside of swivel arm 59a a compression spring 82a is provided which acts upon the parallelogram linkage system through a projection 83a on link 60a and therefore presses the motor unit 31a to 42a upwardly against an adjustable stop. For this purpose, a setscrew 75a is provided which is screwed into a projection 76a on the swivel arm 59a and rests on an abutment 74a which projects from the link 60a.

The apparatus as illustrated in FIGURES 7 and 8 may be used for chamfering the edges 1 and 2 on a board or plate 3, the end side 3a of which, as shown in FIGURE 9, extends at right angles to the outer surfaces of the plate. If, however, plate 3 is mitered and the end side 3a extends at an oblique angle, the table plate 29 must be raised or swiveled accordingly relative to the vertical column 30. For this purpose, the clamping bolt 55 is loosened, table plate 29 is swiveled as required about the trunnion 53, and clamping bolt 55 is then again tightened.

In the different embodiments of the apparatus according to the invention as previously described it is assumed that the workpiece is fed past the fixed milling mechanism by means of driven feed rollers, not shown. If desired, it is, however, also possible to mount the workpiece in a fixed position and to move the chamfering apparatus according to the invention along the workpiece. Furthermore, if desired, it is also possible to replace the feeler or guide rollers of the apparatus by nonrotatable feeler or guide elements.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. Apparatus for working on the corners of flat workpieces, comprising:
   a motor and a rotary cutting tool mounted on the shaft of said motor;
   a plurality of guide members having contact surfaces adapted to engage the surfaces of the workpiece on opposite sides of the corner to be worked on;
   a common supporting element carrying said motor and said guide members, and means for adjusting said motor and said guide members on said supporting element;
   resilient means urging said supporting element toward the workpiece so that said guide members are urged in a direction perpendicular to the corner to be worked on and are pressed against the surfaces of the workpiece on either side of said corner and the cutting tool is urged against the corner to be worked on.

2. An apparatus as defined in claim 1, further comprising means for movably mounting said supporting element, said resilient means comprising spring means acting upon said supporting element so that both guide members are pressed with an equal force against the workpiece.

3. An apparatus as defined in claim 1, in which said supporting element is movably mounted in a manner so as to maintain its position within said common plane and also within a plane extending vertically to said common plane.

4. An apparatus as defined in claim 1, in which the guide members are arranged on said supporting element so that they contact the surfaces of the workpiece closely adjacent to the corner to be worked on.

5. An apparatus as defined in claim 1, in which said guide members and said cutting tool are mounted on said supporting element for adjustment with respect to each other.

6. An apparatus as defined in claim 1, in which said guide members have curved contact surfaces and the radius of curvature of said contact surfaces is larger than the radius of curvature of said tool.

7. Apparatus for working on the corners of flat workpieces, comprising:
   a motor and a rotary cutting tool mounted on the shaft of said motor;
   a plurality of guide members having contact surfaces adapted to engage the surfaces of the workpiece on opposite sides of the corner to be worked on;
   a common supporting element carrying said motor and said guide members and means for adjusting said motor and said guide members on said supporting element;
   resilient means urging said supporting element toward the workpiece so that said guide members are urged in a direction perpendicular to the corner to be worked on and are pressed against the surfaces of the workpiece on either side of said corner and the cutting tool is urged against the corner to be worked on;
   the guide members being arranged on said supporting element so that they contact the surfaces of the workpiece closely adjacent to the corner to be worked on, the centers on which said guide members are supported on said supporting element and the point where said tool engages the workpiece corner lying within a common plane perpendicular to the workpiece corner.

8. An apparatus as defined in claim 7 in which said motor is rigidly mounted on said common supporting element, and further comprising two members for supporting said two guide members, means for mounting said supporting members so as to be pivotable about an axis extending vertically to said common plane, and a common adjusting member for adjusting said supporting members relative to each other so as to vary the distance between said two guide members.

9. An apparatus as defined in claim 8, further comprising a second adjusting member for pivoting said two supporting members of said guide members together relative to said supporting element so as to vary the cutting position of said tool across the cutting surface thereof.

10. Apparatus for working on the corners of flat workpieces, comprising:
   a motor and a rotary cutting tool mounted on the shaft of said motor;
   a plurality of guide members having contact surfaces adapted to engage the surfaces of the workpiece on opposite sides of the corner to be worked on;
   a common supporting element carrying said motor and said guide members and means for adjusting said motor and said guide members on said supporting element;
   resilient means urging said supporting element toward the workpiece so that said guide members are urged in a direction perpendicular to the corner to be worked on and are pressed against the surfaces of the workpiece on either side of said corner and the cutting tool is urged against the corner to be worked on;
   the guide members being arranged on said supporting element so that they contact the surfaces of the workpiece closely adjacent to the corner to be worked on, the centers on which said guide members are supported on said supporting element and the point where said tool engages the workpiece corner lying within a common plane perpendicular to the workpiece corner, said guide members partly covering said tool adjacent to the effective cutting area thereof and thus forming guards to prevent accidental physical injury by said tool.

11. An apparatus as defined in claim 10, further comprising means for adjusting said guide members relative to said tool substantially in the direction of the cutting surface thereof.

12. An apparatus as defined in claim 10, in which said tool has a frusto-conical shape and at least one of said guide members has a complementary frusto-conical shape and partly covers said tool.

13. An apparatus as defined in claim 10, further comprising a support, one of said guide members being mounted on said support in a perpendicular position and having a recess at the side facing said tool, said recess having a shape adapted partly to receive said tool.

14. An apparatus as defined in claim 10, in which one of said guide members comprises a guide roller having a peripheral disklike part at the side facing the tool with a surface extending substantially parallel to the cutting surface of said tool.

15. An apparatus as defined in claim 14, in which the peripheral edge of said guide roller forming a contact surface adapted to engage with the workpiece closely adjacent to the corner to be worked on is crowned.

16. An apparatus as defined in claim 15, further comprising a table plate, stop means along one edge of said table plate adapted to engage with the workpiece, a perpendicular supporting post connected to said table plate at one side of said stop means, a supporting ring mounted on said post above said table plate, a swivel arm on said post resting on said supporting ring and adapted to be swiveled about said post and extending parallel to the edge of said table plate, spring means acting upon said swivel arm, parallelogram linkage means on said swivel arm and movable within a perpendicular plane, an electric motor extending in a perpendicular position and carried by said linkage means, said motor having a downwardly extending shaft, a frusto-conical tool mounted on said shaft, said supporting element being mounted on the housing of said motor and carrying said two guide members and said adjusting means therefor.

17. An apparatus as defined in claim 15, further comprising a table plate, a perpendicular supporting post, a swivel arm pivotally supported on said post, parallelogram linkage means on the swivel arm and movable in a vertical plane; the unit comprising said motor, said tool and said guide members being carried on said linkage means.

18. An apparatus as defined in claim 17, further comprising spring means on said swivel arm acting upon said parallelogram linkage means for at least partly balancing the weight of the unit comprising said motor, said tool, and said guide members.

19. An apparatus as defined in claim 17, further comprising means for mounting said motor so as to be pivotable about a horizontal axis extending parallel to the edge of said table plate.

20. An apparatus as defined in claim 17, in which said motor, said tool, and said guide members form a structural unit for working on the upper corner of a workpiece and further comprising a second unit complementary to said first unit for simultaneously working on the lower corner of the workpiece, a second swivel arm mounted on said post underneath said table plate, and second parallelogram linkage means on said second swivel arm and carrying said second unit.

21. An apparatus as defined in claim 20, further comprising spring means on said swivel arm acting upon said linkage means for pressing said second unit in the upward direction, and an adjustable stop member for limiting the upward movement of said second unit.

22. Apparatus for working on the corners of flat workpieces, comprising:
   a motor and a rotary cutting tool mounted on the shaft of said motor;
   a plurality of guide members having contact surfaces adapted to engage the surfaces of the workpiece on opposite sides of the corner to be worked on;
   a common supporting element carrying said motor and said guide members and means for adjusting said motor and said guide members on said supporting element;
   resilient means urging said supporting element toward the workpiece so that said guide members are urged in a direction perpendicular to the corner to be worked on and are pressed against the surfaces of the workpiece on either side of said corner and the cutting tool is urged against the corner to be worked on;
   the guide members being arranged on said supporting elements so that they contact the surfaces of the workpiece closely adjacent to the corner to be worked on, the centers on which said guide members are supported on said supporting element and the point where said tool engages the workpiece corner lying within a common plane perpendicular to the workpiece corner, said guide members partly covering said tool adjacent to the effective cutting area thereof and thus forming guards to prevent accidental physical injury by said tool;
   one of said guide members comprising a guide roller having a peripheral disk-like part at the side thereof facing the tool with a surface extending substantially parallel to the cutting surface of said tool, the peripheral edge of said guide roller forming a contact surface adapted to engage with the workpiece closely adjacent to a corner to be worked on being crowned;
   a table plate, a perpendicular supporting post, a swivel arm pivotally supported on said post, parallelogram linkage means on the swivel arm and movable in a vertical plane, the unit comprising said motor, said tool and said guide members being carried on said linkage means.

23. Apparatus for working on the corners of flat workpieces, comprising:
- a motor and a rotary cutting tool mounted on the shaft of said motor;
- a plurality of guide members having contact surfaces adapted to engage the surfaces of the workpiece on opposite sides of the corner to be worked on;
- a common supporting element carrying said motor and said guide members and means for adjusting said motor and said guide members on said supporting element;
- resilient means urging said supporting element toward the workpiece so that said guide members are urged in a direction perpendicular to the corner to be worked at and are pressed against the surfaces of the workpiece on either side of said corner and the cutting tool is urged against the corner to be worked on;
- the guide members being arranged on said supporting element so that they contact the surfaces of the workpiece closely adjacent to the corner to be worked on, the centers on which said guide members are supported on said supporting element and the point where said tool engages the workpiece corner lying within a common plane perpendicular to the workpiece corner, said guide members partly covering said tool adjacent to the effective cutting area thereof and thus forming guards to prevent accidental physical injury by said tool;
- a support, one of said guide members being mounted on said support in a perpendicular position and having a recess at the side facing said tool, said recess having a shape adapted partly to receive said tool, the end of said recess guide member adapted to face the workpiece is beveled so as to form a narrow contact surface immediately adjacent to said tool.

References Cited by the Examiner
UNITED STATES PATENTS

| | | | |
|---|---|---|---|
| 1,277,891 | 9/18 | Evans | 90—18 |
| 2,674,926 | 4/54 | Kralowetz | 90—15 |

WILLIAM W. DYER, JR., *Primary Examiner.*